June 30, 1925.

W. C. MORSE

INCUBATOR

Filed April 21, 1922

Inventor
Wilbert C. Morse
By Lancaster and Allwine
Attorneys

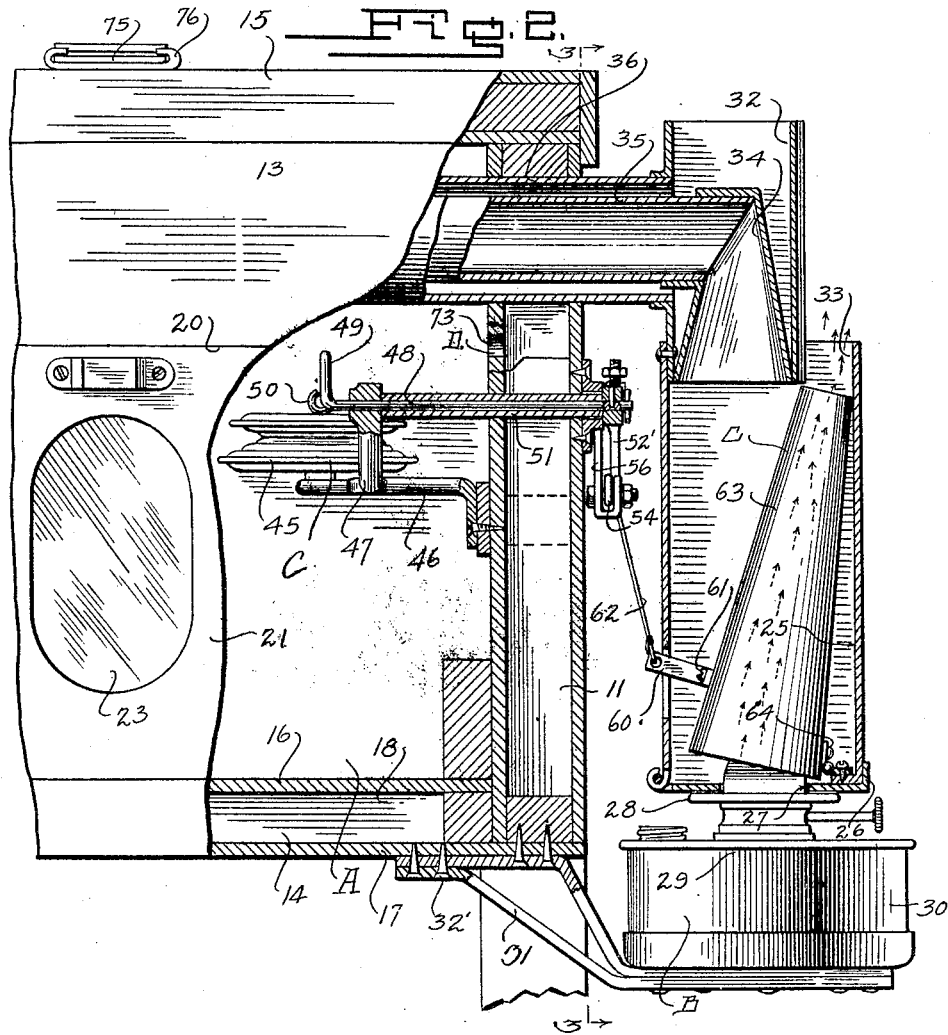

Patented June 30, 1925.

1,544,026

UNITED STATES PATENT OFFICE.

WILBERT C. MORSE, OF HOLLISTER, IDAHO.

INCUBATOR.

Application filed April 21, 1922. Serial No. 555,855.

*To all whom it may concern:*

Be it known that I, WILBERT C. MORSE, a citizen of the United States, residing at Hollister, in the county of Twin Falls and State of Idaho, have invented certain new and useful Improvements in Incubators, of which the following is a specification.

This invention relates to incubators, and the primary object of the invention is the provision of novel means for heating and ventilating the incubator for insuring the correct incubation of the eggs.

Another object of the invention is the provision of novel means for controlling the heating of the incubator, said means embodying a shiftable chimney controlled by a thermostat arranged within the incubator, the chimney being adapted to direct the heat into the incubator under normal conditions and to direct the heat away from the incubator when the incubator becomes too warm.

A still further object of the invention is to provide a novel incubator of the above character, which will be durable and efficient in use, one that will be simple and easy to manufacture, and one which can be placed upon the market at a minimum cost.

With these and other objects in view, the invention consists in the novel construction, arrangement and formation of parts, will be hereinafter more specifically described, claimed and illustrated in the accompanying drawings, forming a part of this specification, in which drawings:

Figure 2 is a fragmentary side elevation of the improved incubator, showing parts thereof in longitudinal vertical section.

Figure 1:
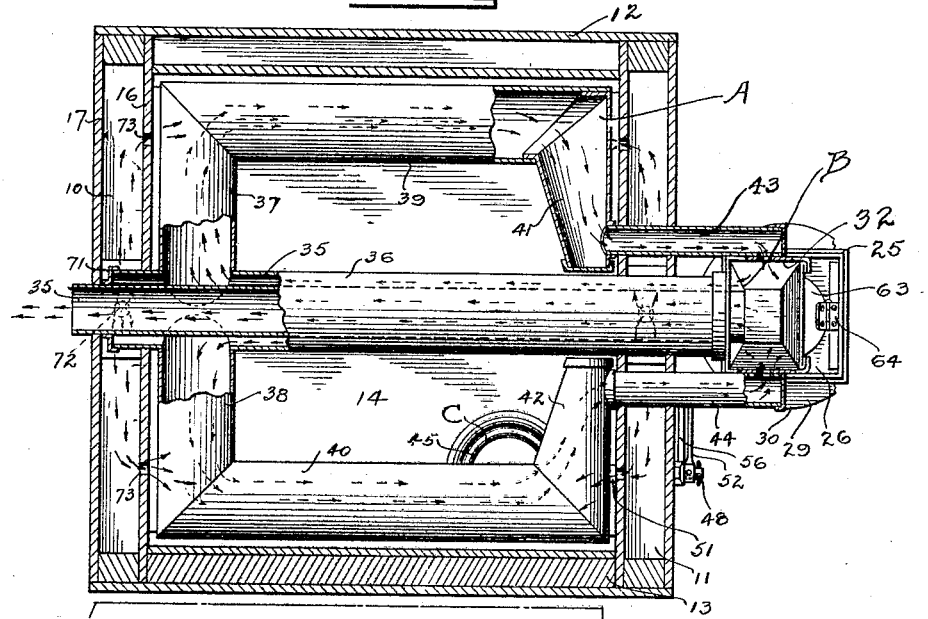
Figure 1 is a horizontal section through the incubator constructed in accordance with this invention, taken on the line 1—1 of Figure 2.
Figure 3:
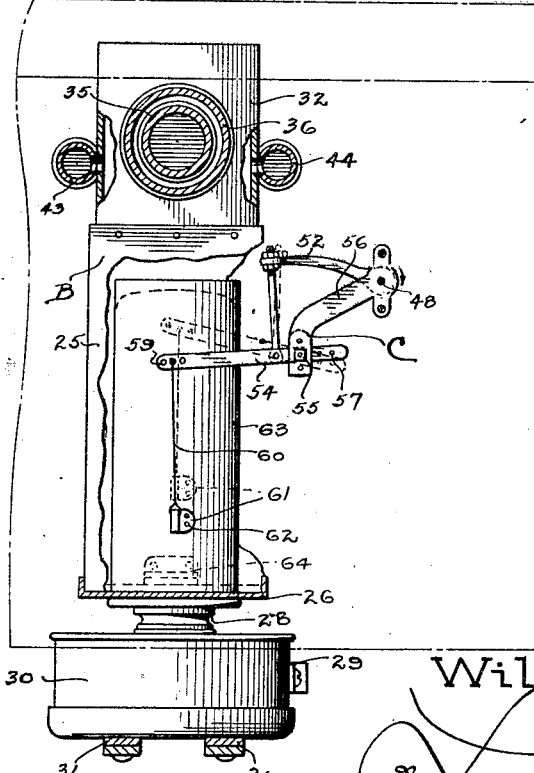
Figure 3 is a fragmentary sectional view taken along the line 3—3 of Figure 2.

Referring to the drawings in detail, wherein similar reference characters designate corresponding parts throughout the several views, the letter A generally indicates the incubator proper; B, the novel heating plant thereof; C, the means for controlling the heating plant; and D, the fresh air ventilating means.

The incubator A may be of any desired size, for incubating the desired number of eggs, and may be constructed in any preferred manner. As shown, the casing of the incubator A includes the end walls 10 and 11; the side walls 12 and 13; the bottom wall 14 and the top wall 15. It is desirable that all of these walls be formed of inner and outer skins 16 and 17 in order to provide a dead air space 18, and if desired, this space may be filled with suitable non-heat conducting material, such as fiber, sawdust or the like. This of course, is immaterial, and the casing of the incubator may be made of any other desired material. The end walls 10 and 11, however, are constructed in a novel manner, in order to provide the fresh air ventilating means D, as will be hereinafter more fully described. The top wall 15 is preferably made removable so that the interior of the incubator A can be readily exposed when making repairs thereto. The front or side wall 13 is provided with an opening 20 which is adapted to be normally closed by a door 21 which can be hingedly secured in place by suitable strap hinges 22. If desired, this door 21 can be provided with glass inserts 23 in order to permit the observing of the eggs when the same are in the incubator. The interior of the incubator can be suitably arranged to receive the trays of eggs (not shown) and the trays of eggs are introduced into the incubator through the opening 20.

The heating plant B comprises an outer vertically disposed casing 25 which is arranged adjacent to the end wall 11 of the incubator, and this casing can be held in place in any preferred manner. The lower end of the casing 25 is closed by a hinged door 26, which can be held in closed position by a suitable clip, if so desired. The hinged door 26, is provided with an axial opening 27, which is adapted to receive the burner 28 of a heat generating member 29, which is shown to be of the oil lamp type. The fount 30 of the heat generating member 29, can be disposed upon a suitable bracket 31, connected to the incubator A in any preferred manner, such as the means indicated by the reference character 32'. The upper end of the casing 25 has disposed in the upper end thereof a water receiving tank 32, which partially closes the top of the casing. As shown, the tank 32 is spaced from one wall of the casing 25, in order to provide an outlet 33, the purpose of which will be hereinafter more fully described. The water receiving tank 32 has disposed therein a hollow cone shaped member 34, for receiving the heat from the burner, and the water from the tank 32 is, of course, adapted to circulate around this hollow cone member 34. The upper end of the heat collector or cone shaped member 34, has communicating therewith a longitudinally extending heat conveying pipe 35. This pipe 35 extends longitudinally through the casing and through the end walls 10 and 11 thereof.

A hot water pipe 36 surrounds the heat conveying pipe 35, and communicates with the hot water tank 32, so that the water, as the same becomes heated may flow into the pipe 36 from the said tank 32. This hot water pipe 36 extends into and terminates in the end wall 10 between the inner and outer skins 16 and 17 thereof. Adjacent to the outer end of the hot water conveying pipe 36, is arranged outwardly extending hot water conveying pipes 37 and 38, which in turn communicate with longitudinally extending hot water conveying pipes 39 and 40, which lead toward the end wall 11 and terminate in inwardly extending water return pipes 41 and 42. The inner ends of these water return pipes 41 and 42, communicate with relatively small outwardly extending return pipes 43 and 44, which communicate with the hot water tank 32, adjacent to the lower end thereof. Thus it can be seen that as the water becomes heated in tank 32 by means of the heat lamp 29, the same will flow out of the tank through the hot water conveying pipe 36, and around the heat conveying pipe 35, into the laterally extending hot water pipes 37, through the longitudinally extending return hot water pipes 39 and 40, then into the pipes 41 and 42, through the return pipes 43 and 44, back into the lower end of the tank. It is obvious that the hot water pipes will effectively heat the incubator in such a manner that no obnoxious odors from the lamp 29 will be permitted to have access into the incubator. The hot air heat conveying pipe 35 of course, leads to the exterior of the casing through the end wall 10.

The control means C for the heating plant B includes a thermostat 45 of any preferred character, which can be held in place by a suitable supporting bracket 46, secured to the end wall 11. This supporting bracket 46 also includes an upwardly extending arm 47, which rockably supports an operating shaft 48. The inner end of this shaft 48 is provided with a right angularly extending bowed arm 49, which terminates in a head 50 for resting upon the upper surface of the thermostat 45. If so desired, a bearing sleeve 51 can be provided for the rocking shaft 48, and this bearing sleeve 51 can be supported by the end wall 11. The shaft 48 extends exteriorly of the incubator A through the end wall 11, and has secured thereto an actuating crank or lever 52. This crank or lever 52 has adjustably connected thereto a depending link 52' for connection with a rocking lever 54. This lever 54 is mounted intermediate its ends upon a removable pin 55, which is supported by a bracket 56, which can be secured to the end wall 11 in any preferred manner. The inner end of the rockable lever 54 is provided with a plurality of openings 57, in any one of which the pin 55 can be positioned for changing the fulcrum point of the lever 54. If desired, the link 52' can be connected with the lever 54 by means of a removable bolt or the like 58, and this bolt also can be inserted in any one of the openings 57.

The outer end of the lever 54, is in turn, provided with a plurality of openings 59, in any one of which can be inserted the upper end of a depending link 60, which is secured to the outer end of an arm 61, which is riveted or otherwise secured as at 62 to a chimney 63. The chimney 63 forms an important part of the present invention and is substantially elliptical shaped in plan, so as to readily fit the outlet 33, formed in the casing 25, and defined by the water tank 32. This chimney 63 is flared toward its lower end, and is of such a size as to readily house the burner 28 of the heating means 29. This chimney is connected to the casing 25, at the lower end thereof, by means of a hinge 64, and it can be seen that this chimney 63 can be shifted by means of the thermostat for leading the hot air directly under the heat collector or cone shaped member 34, or under the outlet 33, in order to lead the heat from out of the casing 25 when the temperature within the incubator reaches a certain degree.

It is obvious that as the thermostat 35 expands due to the action of the heat thereon, the shaft 48 will be rocked and the crank 52 will be raised, thus moving the outer end of the lever 54 upwardly and pulling the link 60 up, thus swinging the chimney 63 on the hinge 64, and moving the contracted end of the chimney 63 in alignment with the outlet 33. When the thermostat 45 contracts, it is obvious that the parts will resume their normal positions, including the chimney 63 due to the action of gravity working thereon, or if desired, springs can be utilized for returning said parts to their normal positions.

The ventilating means D for the ventilator consists of a channel way 70 arranged in the end walls 10 and 11 defined by uprights 71 and the inner and outer skins 16 and 17 of the casing of the incubator. These uprights 71 terminate below the hot air conveying pipe 35 and the hot water pipe 36, and it can be seen that the air flowing up through the channel 70 will come into contact with the said pipes and thus become heated. The channel way 70 has communication with the atmosphere through an opening 72 formed at the bottom of the incubator. The inlet for the air into the incubator is provided for by means of openings 73 formed in the inner skins 16 of the end walls 10 and 11.

If desired, the upper wall 15 may be provided with an air outlet, which can be opened or closed by means of a slide 75. This slide can be mounted in a suitable guide way 76 secured in any preferred manner to the upper surface of the top wall 16.

From the foregoing description, it can be seen that a novel incubator has been provided of simple and durable construction, in which an efficient and improved means has been provided for effectively heating and ventilating the incubator.

Changes in details may be made without departing from the spirit or scope of this invention; but,

I claim:

1. In an incubator including a housing, a source of heat positioned externally of the housing, a conduit having movable means associated therewith for controlling passage of heat therethrough and a thermostat in the incubator housing; means for effecting movement of the control means, said means comprising a rotatable shaft journalled in the housing wall, an arm carried by the inner end portion of said shaft and arranged to bear upon said thermostat, a crank carried by the outer end portion of said shaft, a lever pivotally mounted externally of the incubator, a rod connected with said crank and with said lever for adjustment longitudinally of the lever, and means connecting said lever with the control means for moving the latter to different positions according to the temperature of the incubator.

2. In an incubator including a housing, a source of heat positioned externally of the housing, a conduit having movable means associated therewith for controlling passage of heat therethrough, and a thermostat in the housing; means for effecting movement of the control means, said means comprising a rotatable shaft journalled in the housing wall and extending internally and externally thereof, an arm carried by the inner end portion of the shaft and arranged to bear upon said thermostat, a crank carried by the outer end portion of said shaft, a bracket secured to the wall of the incubator and including an arm extending downwardly and having a U-shaped lower end portion, a lever extending through the U-shaped end portion of the bracket and having openings spaced longitudinally of the lever, a pivot fastener carried by the bracket and extending through a selected opening to pivotally mount the lever in the U-shaped portion of the bracket, a connecting rod having its upper end connected with said crank and its lower end secured in one of the openings of said lever, and means connecting said lever with said control means for moving the latter to different positions according to the temperature of the incubator.

WILBERT C. MORSE.